(12) United States Patent
Gilra

(10) Patent No.: US 11,175,735 B2
(45) Date of Patent: Nov. 16, 2021

(54) CHOICE-BASED ANALYTICS THAT COMBINE GAZE AND SELECTION DATA

(71) Applicant: ADOBE INC., San Jose, CA (US)

(72) Inventor: Anant Gilra, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/658,343

(22) Filed: Jul. 24, 2017

(65) Prior Publication Data

US 2019/0025910 A1 Jan. 24, 2019

(51) Int. Cl.
*G06F 3/01* (2006.01)
*G06F 3/0482* (2013.01)
*G06F 3/0484* (2013.01)
*G06F 3/0481* (2013.01)

(52) U.S. Cl.
CPC ............ *G06F 3/013* (2013.01); *G06F 3/0481* (2013.01); *G06F 3/0482* (2013.01); *G06F 3/04842* (2013.01)

(58) Field of Classification Search
None
See application file for complete search history.

(56) References Cited

U.S. PATENT DOCUMENTS

| 2009/0024964 | A1* | 1/2009 | Kantamneni | G06Q 30/02 715/854 |
| 2015/0177833 | A1* | 6/2015 | Vennstrom | G06F 3/013 345/156 |
| 2016/0124505 | A1* | 5/2016 | Liu | G06F 3/0483 345/156 |
| 2016/0132752 | A1* | 5/2016 | Qvarfordt | G06K 9/00617 382/103 |
| 2016/0139665 | A1* | 5/2016 | Lopez | G06F 3/013 345/156 |
| 2017/0154369 | A1* | 6/2017 | Yu | G06F 3/013 |
| 2017/0212583 | A1* | 7/2017 | Krasadakis | G06F 3/013 |
| 2017/0336865 | A1* | 11/2017 | Meyer | G06F 3/013 |
| 2018/0032816 | A1* | 2/2018 | Trapp | G06F 3/013 |
| 2018/0158359 | A1* | 6/2018 | Quinlan | G06F 3/013 |
| 2018/0174288 | A1* | 6/2018 | Kogan | G06T 7/0002 |
| 2018/0349696 | A1* | 12/2018 | Masuda | G06Q 30/06 |

* cited by examiner

*Primary Examiner* — Stephen G Sherman
*Assistant Examiner* — Donna V Bocar
(74) *Attorney, Agent, or Firm* — F. Chau & Associates, LLC

(57) ABSTRACT

Systems and techniques are disclosed that provide application analytics data that combines gaze data and selection data. An application is configured with UI items that are grouped for analytics tracking and configured to track gazes and selections. When the application is used, the user's eye movements and pauses are monitored to identify when the user gazes upon a UI item. In one embodiment, based on determining that a gaze location is within a bounding box corresponding to a first UI item, the system determines that the gaze corresponded to the first UI item. The system also identifies subsequent selections of other UI items in the group. After a selection of a second UI item in the group is received, application analytics data is provided that identifies the gaze corresponding to the first UI item occurring prior to the selection of the second UI item.

17 Claims, 5 Drawing Sheets

401

PROVIDE ANALYTICS DATA

| SELECTED UI ITEM | OTHER UI ITEM IN THE SAME GROUP | GAZED UPON PRIOR TO SELECTION | LENGTH OF GAZE |
|---|---|---|---|
| CREATE NEW ICON | IMPORT IMAGE ICON | YES | 45MS |
| CREATE NEW ICON | TEMPLATE ICON | NO | 0MS |

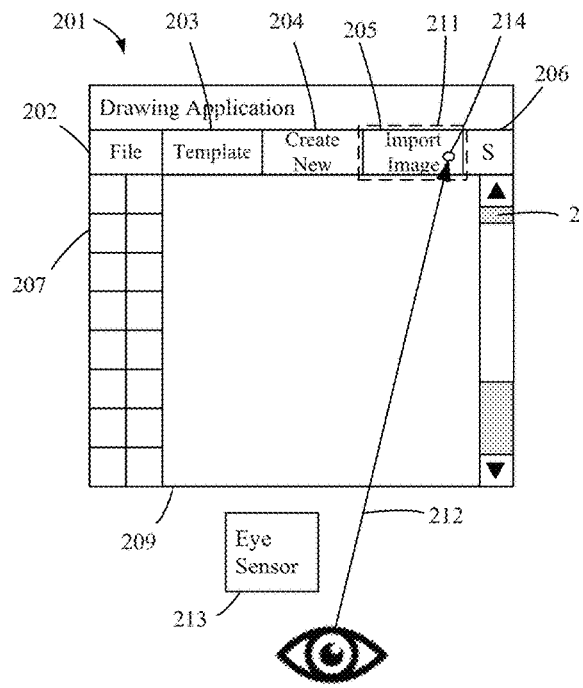
FIGURE 2
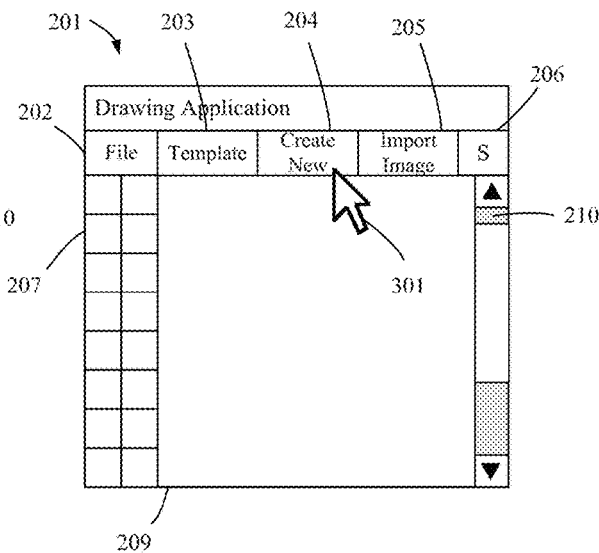
FIGURE 3
PROVIDE ANALYTICS DATA
| SELECTED UI ITEM | OTHER UI ITEM IN THE SAME GROUP | GAZED UPON PRIOR TO SELECTION | LENGTH OF GAZE |
|---|---|---|---|
| CREATE NEW ICON | IMPORT IMAGE ICON | YES | 45MS |
| CREATE NEW ICON | TEMPLATE ICON | NO | 0MS |
FIGURE 4

CHOICE-BASED ANALYTICS THAT COMBINE GAZE AND SELECTION DATA

TECHNICAL FIELD

This disclosure relates generally to computer-implemented methods and systems and more particularly relates to improving the efficiency and effectiveness of computing systems that track and evaluate the use of user interface (UI) items in computer applications.

BACKGROUND

Conventional application analytics systems are limited to deriving analytics from information that the application's users provide through direct UI interactions, e.g., mouse movements and clicks, finger taps and drags, etc. For example, conventional analytics systems are able to capture analytics data for the number times a UI item was selected, e.g., how many times a "save as" icon was clicked. While useful, such analytics often provide an incomplete picture of the performance of a UI item. This is because the performance of a UI item often depends both on the desirability of the associated action and the discoverability of the UI item itself. For example, where a UI provides a user with 'n' UI item choices, some of these choices may be more discoverable than others. 98% of users may observe that there is a "save as" icon while only 30% of users may observe that there is a "share" icon. Such differences in discoverability can be due to the layout of the UI, the size and other characteristics of the icons, user prior experiences and expectations, and numerous other factors.

Conventional analytics systems do not provide sufficient information about UI item discoverability because discoverability is difficult to infer from direct UI interactions. The following example illustrates how conventional systems fail to provide sufficient information about UI item performance. In this example, an application development team includes a camera icon on the UI of their application. When the application is used and the camera icon is selected, the application presents a screen that exposes several tools for importing an image. The analytics team can use conventional analytics to analyze use of the action associated with the camera icon. In this example, the team observes analytics data that shows that the camera icon was not clicked as often as the team expected, i.e., it received far fewer clicks than expected relative to other UI item selections. Conventional analytics systems provide no way to estimate how much of this poor performance is due to lack of discoverability as opposed to lack of desirability of the UI item. The application development team has no way to determine whether it would be helpful or not to move the camera icon to a new location, make it more prominent, or otherwise take corrective actions to address the UI item's potential lack of discoverability.

Conventional systems also provide information about the popularity of a UI item that generally lacks certainty. While such systems can measure the number of times each UI item was selected to allow popularity comparisons, such popularity can be skewed by differences in discoverability. In the example above, the team may identify that a "use default image" icon is four times as popular the camera icon. However, the team will have considerable uncertainty about how much of this popularity difference is due to differences in the discoverability of the UI items. Similarly, conventional analytics systems also provide no way to determine which UI item were considered by the users as options before making their UI item selections. In the example, there is no way for the development team to determine that users considered selecting the camera icon before selecting a save icon. Without the ability to assess discoverability, conventional application analytics systems provide incomplete and inadequate information about UI items performance, popularity, and relationships to other UI items.

SUMMARY

Systems and techniques are disclosed herein for providing application analytics data that combines gaze data and selection data. In one embodiment of the invention, an application is configured with UI items that are grouped for analytics tracking and the application is configured to track gazes and selections. When the application is used, the user's eye movements and pauses are monitored to identify when the user gazes upon a UI item. In one embodiment, based on determining that a gaze location is within a bounding box corresponding to a first UI item, the system determines that the gaze corresponded to the first UI item. Subsequent selections of other UI items in the group are also identified. After a selection of a second UI item in the group is received, application analytics data is provided that identifies the gaze corresponding to the first UI item occurring prior to the selection of the second UI item. In this way, analytics data is provided that accurately captures that the user observed the first UI item before selecting the second UI item. Such information is useful to assess the discoverability, popularity, and/or user consideration of UI items.

These illustrative features are mentioned not to limit or define the disclosure, but to provide examples to aid understanding thereof. Additional techniques are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 2 illustrates a graphical depiction of tracking a gaze relative to UI items of a UI of an application.

FIG. 3 illustrates a graphical depiction of tracking a selection of a UI item of the UI of FIG. 2.

FIG. 4 is a block diagram illustrating analytics data provided based on combining the gaze data and selection data of FIGS. 2 and 3.

DETAILED DESCRIPTION

Figure 1:
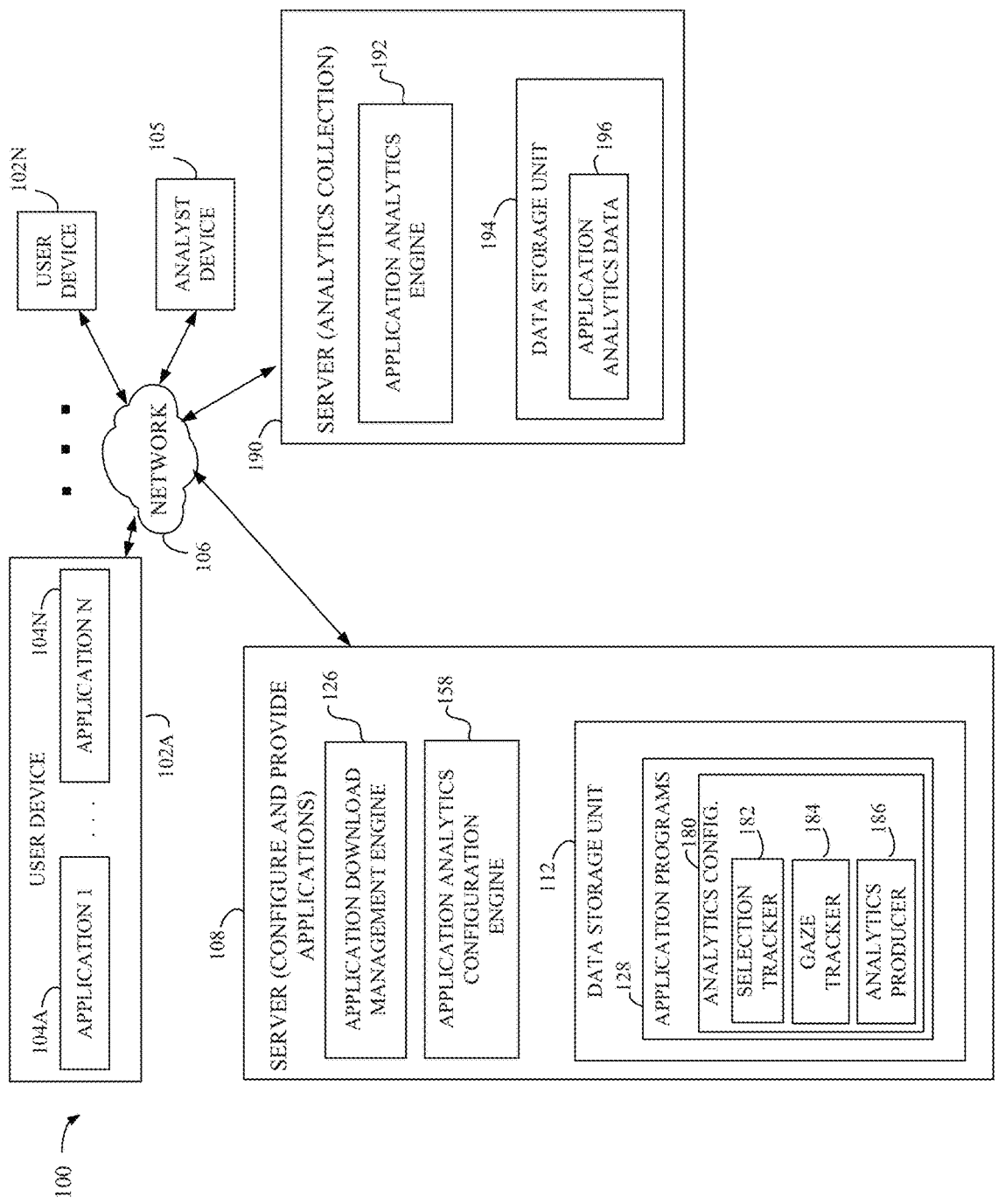
FIG. 1 illustrates an exemplary computer network environment in which techniques for providing application analytics data that combines gaze data and selection data can be implemented.

As described above, conventional application analytics systems do not provide sufficient information about the discoverability, popularity, or user consideration of user interface items. Embodiments of the invention address these and other deficiencies of conventional systems by using gaze (e.g., eye movements and pauses) along with user selection data (e.g., click and tap data) to provide more accurate and reliable information about the discoverability, popularity, or user consideration of user interface items. Gaze and selection data is combined to provide analytics data regarding the UI item options that were considered and/or not considered before users make particular selections. The gaze information is used to identify items that were gazed upon (e.g., for more than a threshold amount of time) before another item is selected. For example, the gaze information is analyzed to identify that a user gazed at item B before selecting item A but did not gaze at item C before selecting item A.

Gaze information from multiple users is combined to provide analytics about the discoverability of UI items. For example, data showing many more users gazing on item B than on item C before selecting item A is used as an indication that the discoverability of item B is greater than that of item C. Moreover, in some embodiments of the invention, the gaze information is analyzed to provide a numerical assessment of discoverability, for example, providing a discoverability value between 0 and 1 on a discoverability index. Discoverability information determined using embodiments disclosed herein is additionally used to adjust UI item click data and other performance metrics to account for discoverability. Such adjusted performance metrics provide more accurate and reliable measures of the performance of the UI items.

Embodiments of the invention group UI items into groups and then determine discoverability based on the selections and gazes that occur within the group. Such group-based discoverability determinations provide discoverability information that is relevant and useful. In one embodiment, information specifying one or more groups is received from an analyst who is configuring analytics to compare or assess user choices available in particular contexts or for one or more other particular objectives. For example, an analyst wishing to compare three items (e.g., a drawing tool icon, an eraser tool icon, and a filter icon) can group those three items together. The system will use this grouping in providing discoverability information to the analyst that identifies how discoverable these UI items are relative to one another. For example, such discoverability information may identify that users gaze upon the eraser tool icon far more than on the filter icon before selecting the drawing tool icon. In other words, in the context of selecting the drawing tool, the eraser tool has greater discoverability than the filter.

The UI items that are tracked are generally associated with actions. For example, actions are generally initiated via interactions with at least some of UI items in an app or a webpage. As a user interacts with such an application (e.g., by dragging, clicking, or taping), information about the triggered actions are sent as analytic events. Embodiments of the invention supplement this selection/action data with information about the user's activity prior to each selection/action. In one embodiment of the invention, this involves gathering data on which UI items for a set of similar, related, or otherwise grouped actions were considered before a particular UI item and associated action in the group was selected. Data is gathered for a variety of different types of UI items including independent UI items such as menu items, radio buttons, check boxes and choice-based items such as items that ask for a selection of a type of file to open/import, where to import from, where to save, what effect/adjustment/operation to perform, etc., in which the user chooses from one of the many possible choices.

By grouping items for analytics purposes and combining gaze and selection data, embodiments of the invention are able to determine more accurate and reliable information about the discoverability, popularity, and user consideration of user interface items. Unlike conventional techniques that are limited to deriving analytics from information that the user provides through direct UI interactions, e.g., mouse movements and clicks, figure taps and drags, etc., embodiments of the invention additionally use gaze information to provide enhanced and more accurate results. Moreover, because accurate results can be derived from less data, embodiments of the invention significantly improve upon the efficiency and effectiveness of conventional application analytics systems.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "electronic content" refers to any content in an electronic communication such as a web page or e-mail accessed by, or made available to, one or more individuals through a computer network such as the Internet. Examples of electronic content include, but are not limited to, images, text, graphics, sound, and/or video incorporated into a web page, search engine result, or social media content on a social media app or web page.

The phrase "application" refers to any electronic content that executes or is otherwise interpreted by one or more computer devices to display a UI interface that responds to user inputs such as mouse clicks and finger taps. The phrase "application" includes executables, markup language pages, mobile device apps, as well as to electronic content that is provided locally or remotely, e.g., via a cloud service.

As used herein, the phrases "user interface item" and "UI item" refer to any displayed element of a user interface of an application. Examples of UI items include, but are not limited to, input items such as checkboxes, radio buttons, dropdown list elements, buttons, toggles, text fields, and data fields. Examples of UI items also include, but are not limited to, items such as breadcrumbs, sliders, search fields, pagination indications, tags, icons, text, graphics, tooltips, progress bars, notifications, message boxes, modal windows, and accordians.

As used herein, the phrase "analytics data" refers to any information or other data that is collected or determined based on information or other data that is collected that relates to use of an application by one or more users. Embodiments of the invention determine analytics data based on selection data and/or gaze data.

As used herein, the phrase "gaze data" refers to any information or other data that is collected or determined based on information or other data that is collected that relates to one or more users' eye gazes during use of an application. Gaze data can be based upon and/or otherwise relate to user eye movements and eye pauses tracked using a camera or other sensor.

As used herein, the phrase "gaze location" refers to coordinates on a user interface (UI) associated with a gaze.

For example, based on tracking one or more user eye movements and/or pauses a gaze tracker can associate a given eye pause with the eye in a given position with a particular screen location. A gaze location (determined using a sensor) is generally at or near a location on the UI that the user is actually looking. The accuracy will of course depend on the accuracy and calibration of the eye sensing components. For example, if a user is looking at a button, the gaze location that is determined based on tracking the user's eye movements and pauses will generally be within or near the button on the UI given appropriately sensitive and well-calibrated eye sensing components. The amount of margin around such a button will thus generally be based on the accuracy of the eye sensing components.

As used herein, the phrase "selection data" refers to any information that is collected or determined based on other information that is collected that relates to one or more users' clicks, taps, or other selections during use of an application. For example, selection data may be based upon or otherwise relate to a user selecting a particular UI item, e.g., tracking that the user has selected the "save as" UI command.

As used herein, the phrase "bounding box" refers to an area of a UI interface that is associated with a UI item. A bounding box can be the same as the location of the UI item on the UI or can be different from the location of the UI item on the UI. For example, a bounding box includes the location of the UI item on the UI and additional area based on a margin (e.g., 10%) around the UI item.

Exemplary Computing Environment

FIG. 1 is a diagram of an environment 100 in which one or more embodiments of the present disclosure can be practiced. The environment 100 includes one or more user devices, such as a user device 102A up to a user device 102N and an analyst device 105. Each of the user devices is connected to a server 108 via a network 106. A user of the user devices 102A-N and an analyst using analyst device 105 use various products, applications, or services supported by the server 108 via the network 106. The user devices 102A-N correspond to various users. Examples of the users include, but are not limited to, creative professionals or hobbyists who use creative tools to generate, edit, track, or manage creative content, end users, administrators, users who use document tools to create, edit, track, or manage documents, advertisers, publishers, developers, content owners, content managers, content creators, content viewers, content consumers, designers, editors, any combination of these users, or any other user. An analysts is any user who configures an application with application analytics capabilities and/or that uses analytics data provided by such a configured application.

Examples of the user devices include, but are not limited to, a personal computer (PC), tablet computer, a desktop computer, a processing unit, any combination of these devices, or any other suitable device having one or more processors. Each user device includes at least one application supported by the server 108.

Examples of the network 106 include, but are not limited to, internet, local area network (LAN), wireless area network, wired area network, wide area network, and the like.

The server 108 includes one or more engines. The server 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The server 108 also includes a data storage unit 112. The data storage unit 112 can be implemented as one or more databases or one or more data servers. The data storage unit 112 includes data that is used by the engines of the server 108.

A user of the user device 102A visits a webpage or an application store to explore applications supported by the server 108. The server 108 provides the applications as a software as a service (SaaS), or as a standalone application that can be installed on the user device 102A, or as a combination. For example, the user can access and use the application download management engine 126 to install various applications supported by the server 108. As a specific example, a user may install a video composition creation application on user device 102A to create video compositions using local and/or remotely-stored videos. Application installers or application programs 128 present in the data storage unit 112 are fetched and made available to the user.

The application analytics configuration engine 158 is accessible by the analyst device 105 to allow an analyst to configure the application programs 128 with analytics. The analyst can be, but need not be, part of an application development team that creates the application programs 128. The application analytics configuration engine 158 receives input from an analyst grouping UI items for analytics tracking, specifying which UI items should be tracked with respect to gaze and/or selection, and/or specifying how the analytics data should be provided. For example, an analyst may identify a group of three UI items for gaze and selection tracking and specify that the analytics data that it provides should identify gaze percentages, discoverability values, and provide automatically adjusted selection data (e.g., selection data that is adjusted based on discoverability). The application analytics configuration engine 158 also receives input and/or automatically determines bounding boxes around UI items for the purpose of correlating sensed gaze locations on the UI with particular UI items.

Based on input/specifications received from analyst, the application analytics configuration engine 158 configures one or more of the application programs 128 with analytics capabilities. In one embodiment, this involves adding and/or changing the code of the application to facilitate the analytics tracking. For example, an analytics library can be used to add gaze and/or selection tracking procedures to the application. UI items that are configured for analytics are configured to call such procedures. For example, an application program can be configured with an analytics configuration 180 that includes a selection tracker 182, a gaze tracker 184, and an analytics producer 184. When a given UI item is selected, in addition to performing the associated action, a selection tracking procedure can be called that collects analytics data about the selection. Specifically, the selection tracker 182 identifies the selection (i.e., which UI item was selected) and stores data about the selection. The analytics producer 186 then provides analytics data about the selection, for example, for storage as application analytics data 196 in data storage unit 194 of an analytics collection server 190. The analytics collection server 192 include an application analytics engine 192 that receives and stores such application analytics data 196. In circumstances in which the application is being used on a user device 102A, such analytics data is stored locally on the user device 102A and/or sent via network 106 for remote storage in the application analytics data 186.

Similarly, configuring an application for gaze-based analytics can involve adding one or more procedures from the analytics library. Such procedures can invoke a camera or other sensor of the associated computing device when the application is used by a user to monitor the user's eye movements and eye pauses. In the embodiment of FIG. 1, the analytics configuration includes a gaze tracker 184 that receives input from a camera or other sensor on user device 102A on which the application is being used by the user. When a gaze pause (e.g., of more than a threshold time) is detected, the gaze tracker 184 detects the pause and determines a corresponding UI item, if any. The gaze tracker 184 also collects analytics data about the gaze. The analytics producer 186 then provides analytics data about the gaze, for example, for storage as application analytics data 196. As described above, in circumstances in which the application is being used on a user device 102A, such analytics data is stored locally on the user device 102A and/or sent via network 106 for remote storage in the application analytics data 186. The analytics data combines gaze and selection data. For example, in one embodiment of the invention, the analytics data will identify that a first UI item in a group was gazed upon prior to a selection of a second UI item in the group.

Thus, in some embodiments, the user interaction (gazes and/or selections) with the application programs 128 is tracked by the application analytics engine 192 and stored as application analytics data 196. The application analytics data 196 can include, for example, usage of a tool, feature, or other UI item, usage of a workflow, usage of assets, and the like. The application analytics data 196 can include the usage data on a per user basis and can also include the usage data on a per UI item basis or any other basis.

Generally, the application analytics configuration engine 158 embeds a piece of code in the application programs 128 to provide an analytics configuration 180 that enables an application program to collect analytics data. In one embodiment, the code causes the analytics data to be sent to the application analytics engine 192. The application analytics engine 192 stores the usage data as the application analytics data 196 and processes the application analytics data 196 to draw meaningful output. For example, the application analytics engine 192 can draw an output that the discoverability of a first UI item is 0.4 and the discoverability of a second UI item is 0.7 on a zero to one discoverability index scale. Such information can be based on combining analytics data from many users. The output of the application analytics engine 192 can be used by an analyst or application creator to revise, update, or otherwise improve the application programs 128.

In addition, the output of the application analytics engine 192 can be used to personalize or otherwise automatically adjust application programs 128. For example, if the analytics data identifies that the discoverability of a particular UI item is below a threshold for a particular user (or all users), the application can be automatically changed to increase the prominence of that item for the user (or for all users), to provide a tip to identify the undiscoverable UI item, or take other corrective action. Accordingly, the application analytics can be used to provide automatic adjustments to balance UI item discoverability amongst the UI items and/or otherwise address discoverability issues on a per user or overall basis. Other types of personalization can also be performed based on the application analytics data 196.

FIG. 2 illustrates a graphical depiction of tracking a gaze relative to UI items of a UI 201 of an application. The UI 201 includes various UI items including a file icon 202, a template icon 203, a create new icon 204, an import image icon 205, a save icon 206, various tool buttons 207, a canvas 209, and a slider 210. In this example, an analyst has identified a group of three UI items (the template icon 203, the create new icon 204, and the import image icon 205). In addition, the analyst has identified bounding boxes around each of these UI items 204, 205 to identify the locations on the UI to associate with each of the icons 204, 205 for gaze tracking purposes. For example, the bounding box 211 associated with the import image icon 205 is illustrated in FIG. 2.

FIG. 2 additionally illustrates tracking the eye movements and pauses of a user's eye using eye sensor 213. In this example, the eye sensor 213 detects a gaze 212 by detecting that the user's eye has paused while gazing at gaze location 214 for more than a predetermined threshold amount of time, e.g., more than 10 ms. A gaze tracker (e.g., gaze tracker 184 of FIG. 1) uses the information about the gaze location 214 to determine that the gaze location is within bounding box 211 and thus corresponds to the import image icon 205.

FIG. 3 illustrates a graphical depiction of tracking a selection of a UI item of the UI of FIG. 2. In this example, the user uses a mouse input device to control cursor 301 to select the create new icon 204, e.g., with a mouse click. A selection tracker (e.g., selection tracker 182 of FIG. 1) uses receives the selection and tracks information about the selection. For example, this information can include information about the UI item, the corresponding action within the application that is performed based on the selection, the time of the selection, and the identify of the user making the selection. In this example, the selection of the create new icon 204 is received after the gaze upon the import image icon 205 detected.

FIG. 4 is a block diagram illustrating analytics data provided based on combining the gaze data and selection data of FIGS. 2-3. In this example, analytics data 401 is collected and provided by an analytics producer (e.g., analytics producer 186 of FIG. 1). The analytics producer 186 tracks gazes and clicks and provides analytics data reflecting desired information. In this example, the analyst has identified a group of three UI items (the template icon 203, the create new icon 204, and the import image icon 205). When one of the UI items is selected by a user, the analytics producer determines whether any of the other UI items in the group have been gazed upon (e.g., within a threshold amount of time, since a prior selection, or satisfying other criteria). In this example, prior to the selection of the create new icon 204, the import image icon 205 was gazed upon and the template icon 203 was not gazed upon. Accordingly, the analytics data 401 includes a first entry that identifies the selection UI item (create new icon), the other UI item in the same group (import image icon), whether this other icon was gazed upon prior to the selection (yes), and the length of the gaze (45*ms*). Similarly, the second entry identifies the selection UI item (create new icon), the other UI item in the same group (template icon), whether this other icon was gazed upon prior to the selection (no), and the length of the gaze (0 ms).

The analytics data provided is illustrative and other types of information can be tracked depending upon the system implementation, the nature of the application, and/or the analyst preferences. For example, an imaging app can include UI items for selecting between different types of project starting points (e.g., starting from a stock image, importing an image to start with, capturing an image from camera to start with, or using an empty canvas. These UI items and corresponding actions can involve sub-UI items. For example, when users import/open an image, the image sub UI items can be selected to allow the user to select from importing the image from a social media webpage, a cloud storage location, etc. Similarly, a modify UI item can include sub UI items that provide the user with multiple workspace options like adjust, looks, cutout, upright, fill etc. Moreover, within each of these UI items, there can be additional sub UI items. For example, the adjust UI item could provide access to exposure, contrast, highlights, shadows, saturation and/or other UI items. These UI items could allow still further drill down.

Figure 5:
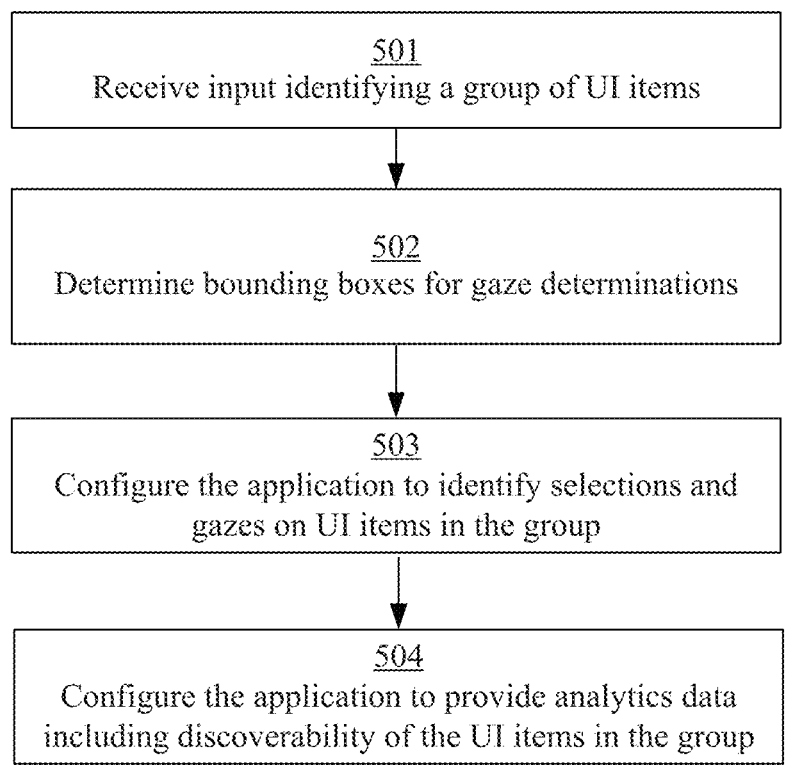
FIG. 5 is a flow chart illustrating an exemplary technique for configuring an application to provide application analytics data that combines gaze data and selection data.

FIG. 5 is a flow chart illustrating an exemplary technique 500 for configuring an application to provide application analytics data that combines gaze data and selection data. The exemplary technique 500 is described in the context of implementation via an application analytics configuration engine 158, although other devices and configurations can also be used to implement the technique 500. The exemplary technique 500 can be implemented by storing and executing instructions in a non-transitory computer-readable medium. Reference to the technique 500 being performed by a computing device includes the technique 500 being performed by one or more computing devices.

In the technique 500 the application analytics configuration engine 158 receives input identifying a group of UI items, as shown in block 501. In one embodiment, an analytics configuration interface is used in an application development environment. In this embodiment, either code of the application or a what you see is what you get (WYSIWYG) view of the user interface of the application is presented and the analyst provides input that identifies one or more of the UI items to be included in the group. The analyst can use the analytics configuration interface to specify one or more groups of UI items for analytics tracking.

The application analytics configuration engine 158 further determines bounding boxes for gaze determinations, as shown in block 502. This determination can be automatic and/or based on user input. For example, the bounding box associated with each UI item can automatically be determined by adding a predetermined margin around that actual boundary of the UI item (e.g., by adding 5%). In another example, the user draws a boundary around a UI item to provide the bounding box for the item. In one embodiment, bounding boxes are determined based on machine learning. In such an embodiment, a neural network is trained with ground truth bounding boxes that reflect actual gaze locations for a plurality of input UI configurations (e.g., samples with many UI items, few UI items, large UI items, small UI items, samples with large variation in UI item size and shape, samples with small variation in UI item size and shape, etc.). The neural network is then used to provide a determination of bounding boxes for the gaze determinations.

The analytics configuration interface can also receive input that provides other characteristics of the analytics tracking including, but not limited to, a gaze threshold for distinguishing gazes from non-gazes and/or other information used to generate mappings of gaze locations to UI locations/items. The analytics configuration interface can receive input naming UI items and/or providing each UI item with unique identifiers. In addition, the analytics configuration can receive input that specifies or adjusts information using to provide one or more maps for each UI item that identify portions of the UI associated with the respective UI items for gaze and/or selection purposes. The analytics configuration can additionally receive input specifying the types of information that will be tracked. For example, the configuration can specify whether the system will track data related to false positives where the pupil is out of focus, etc.

The application analytics configuration engine 158 next configures the application to identify selections and gazes on UI items in the group, as shown in block 503. As described above with respect to FIG. 1, in one embodiment this involves adding and/or changing the code of the application to facilitate the analytics tracking. For example, an analytics library can be used to add gaze and/or selection tracking procedures to the application. UI items that are configured for analytics are configured to call such procedures. When a given UI item is selected, in addition to performing the associated action, a selection tracking procedure can be called that collects analytics data about the selection. Similarly, configuring an application for gaze-based analytics can involve adding one or more procedures. Such procedures can invoke a camera or other sensor of the associated computing device when the application is used by a user to monitor the user's eye movements and eye pauses.

The application analytics configuration engine 158 also configures the application to provide analytics data including discoverability of the UI items in the group, as shown in block 504. In one embodiment of the invention, this involves adding procedures that collect and/or send application analytics data to an appropriate collection storage location. The analytics data is processed and/or combined to provide analytics data that is appropriate for the analyst. For example, the analytics data regarding discoverability can be quantified (e.g., with a value between 0 and 1 on a discoverability index scale) and used to adjust UI item performance data. The analytics configuration can be based on input from an analyst specifying the type and/or format of the desired analytics data, i.e., the output format. The analytics configuration can additionally or alternatively be based on input from an analyst specifying that the analytics data should be used to automatically change the configuration of the application. For example, UI items can be repositioned, reordered, resized or otherwise changed to attempt to make the UI items more or less discoverable. Following a change, the analytics data can be assessed to determine whether additional changes are to be automatically implemented. In this way, an application can be configured to automatically change its UI configuration to achieve balanced or otherwise appropriate desirability of UI items.

In one exemplary embodiment of the invention, application analytics are configured using an analytics framework that exposes a means to send events or actions. These are added at appropriate places in the code of the application by the analyst/application developer. For example, configuring the application involves the following steps in one embodiment. During initialization of the application, an analyst/application developer specifies a set of groups of UI items (or corresponding actions). Each group can have any number of UI items/actions. A UI item/ action could be placed in multiple groups as well. The bounding box of a UI item (plus margins) links a gaze location to the item. In additional, a location map L is maintained for location bounds, corresponding UI item, and/or corresponding action.

The analyst/application developer also incorporate a gaze tracking framework which monitors eye movement and pauses i.e. gaze tracking. Incorporating gaze tracking allows the analytics tracker to determine the gaze locations on the screen where a user pauses his or her eye movements for more than a given threshold duration. Generally eye tracking technologies work by using a camera or sensor to track user's eye to determine at least an approximate location on the user interface that the user is looking at. Embodiments of the invention refine and enhance existing eye tracking techniques by fine tuning or otherwise calibrating eye tracking information based on subsequent user selections. If a user makes 100 selections of UI items, the 100 corresponding gazes for those clicks are analyzed to create a gaze map. The gaze map correlates all of points that were selected on the user interface and all of the places that were gazed upon in a short time interval prior to each selection. In one example, a, Z has UI item identifiers, images of previous eye pupils corresponding to clicks on the UI items, and center location points. The more gazes and selections, the more accurate the gaze map becomes. The gaze map allows eye positions to more more accurately associated with user interface locations. When a new gaze is analyzed, the new image of pupil/retina can then be compared with the existing mapping, for example, to determine which eye position it is closest to. This gaze map thus provides an accurate gaze location for a gaze which can then be used with a location map to determine which UI item the gaze corresponds to. In the case of ambiguity, the closest UI item (e.g., with the closest centerpoint) is identified.

The characteristics of the eye can also be used to determine whether the user is actually looking at the UI item versus simply day dreaming without focusing on what he or she is looking at, for example, by determining whether the focus of the retina or focused on a location between (and outside of) two UI items. In one example, checks are applied to filter out some gazes that may not be accurate by removing false positives where the pupil is out of focus and/or using a strict time threshold to filter out glances that are not real gazes in which the user comprehends the UI item that is gazed upon. The application is thus configured to determine the corresponding items on the UI that was gazed upon.

The analyst/application developer also configures the application to monitor clicks/finger touch/drag and other selections. The application is configured to search for the corresponding action, identify group G, and provide analytics data about any gazes that occurred previously with respect to those other UI items in the group.

Figure 6:
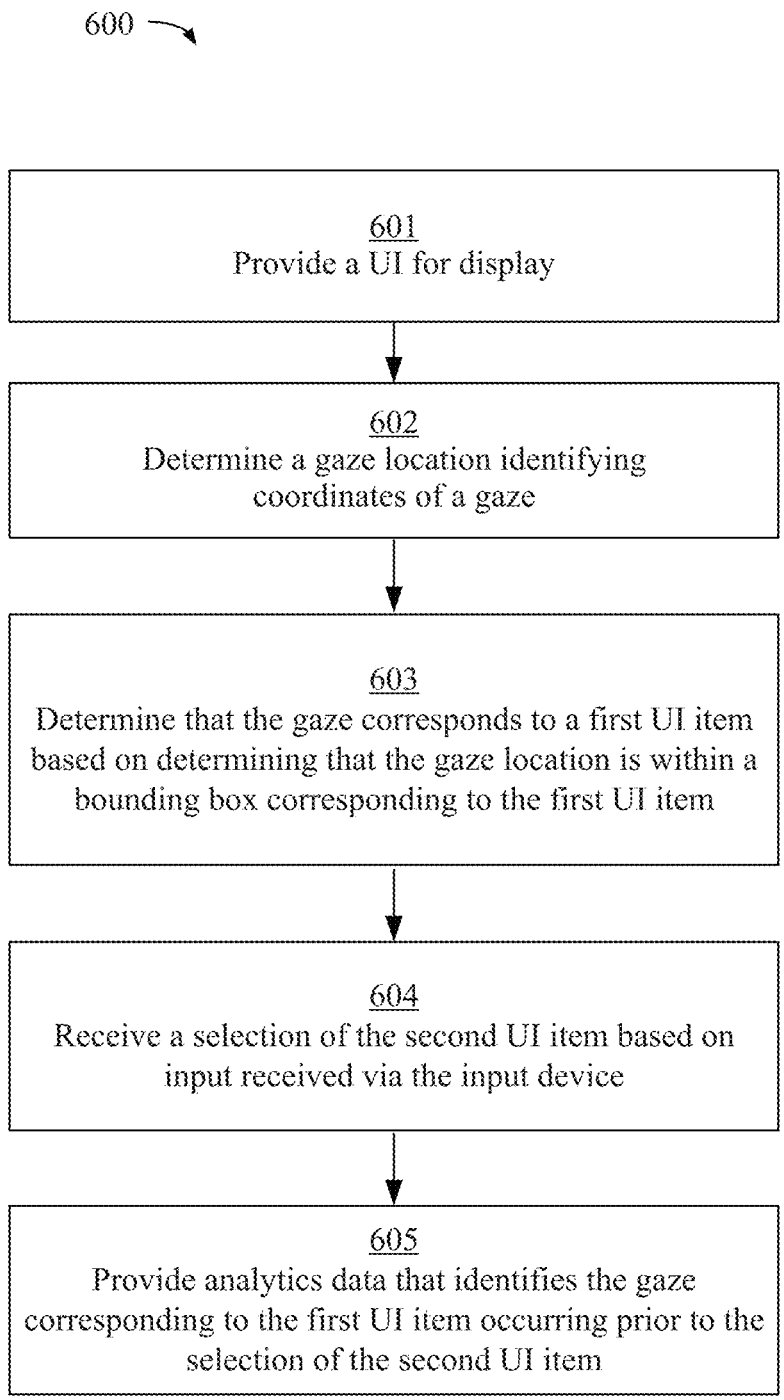
FIG. 6 is a flow chart illustrating an exemplary technique for providing application analytics data that combines gaze data and selection data.

FIG. 6 is a flow chart illustrating an exemplary technique 600 for providing application analytics data that combines gaze data and selection data. The exemplary technique 600 is described in the context of implementation via an analytics configuration 180 of an application illustrated in FIG. 1. Specifically, the following description describes an example in which an application that includes an analytics configuration 180 (FIG. 1) with three analytics modules (selection tracker 182, gaze tracker 184, and analytics producer 186) that perform portions of the technique 600. Other devices and configurations can also be used to implement the technique 600. The exemplary technique 600 can be implemented by storing and executing instructions in a non-transitory computer-readable medium. Reference to the technique 600 being performed by a computing device includes the technique 600 being performed by one or more computing devices.

In technique 600, an application is executed or interpreted by a computing device to provide a UI for display, as shown in block 601. The UI includes UI items that are selectable by user interactions received via an input device. The UI is also configured for analytics by including one or more modules such as selection tracker 182, gaze tracker 184, and analytics producer 186 of FIG. 1. In addition, some or all of the UI items are included within a group of UI items identified for analytics tracking. In technique 600, the group of UI items includes at least a first UI item and a second UI item. During use of the application by a user the selection tracker 182, gaze tracker 184, and analytics producer 186 track and produce analytics related to the UI items in the group.

When a gaze is detected, in technique 600, the gaze tracker 184 determines a gaze location identifying coordinates of the gaze, as shown in block 602. The gaze location is determined based on monitoring eye movements and eye pauses. In one embodiment, this involves determining that the gaze occurred by identifying an eye pause of more than a predetermined threshold duration. In technique 600, the gaze tracker 184 further determines that the gaze corresponds to the first UI item based on determining that the gaze location is within a bounding box corresponding to the first UI item, as shown in block 603. This can involve accessing a location map that identifies bounding boxes corresponding to the UI items and/or actions corresponding to the UI items. As described above, such bounding boxes can be determined based on the actual boundaries/perimeters of the UI items and may include margins around those actual boundaries.

In technique 600, the selection tracker 182 receives a selection of the second UI items based on input received via the input device, as shown in block 604. Selection tracking can utilize conventional techniques for detecting triggering events and responding with appropriate actions. For example, analytics procedures can be added to or called from routines that provide the application's actions in response to selection events that are detected on the UI.

The gaze and selection data is provided or made available to the analytics producer 186 which provides analytics data that identifies the gaze corresponding to the first UI item occurring prior to the selection of the second UI item, as shown in block 605. The analytics data identifies which of the UI items in the group were gazed upon and/or which of the UI items in the group were not gazed upon prior to the selection of the second UI item. This information can be limited using a time threshold or based on additional characteristics. For example, only those UI items that were gazed upon within a predetermined threshold of time prior to the selection are identified as gazed upon prior to the selection in one embodiment of the invention. In another embodiment, only those UI items that were gazed upon since a previous selection on the UI are identified as gazed upon prior to the selection.

In some embodiments of the invention, a map or other data element is used that includes UI item identifiers and corresponding values. In one example, the value is a struct (structure) that includes additional data. For example, the value can identify a corresponding action, a Boolean value for gaze, etc. In one embodiment of the invention, an exemplary data array is used that identifies, for each respective UI item in a group, an associated action and whether the respective UI item was gazed upon. An alternative array identifies, for each respective UI item in the group, an associated action and time spent gazing on the respective UI item.

The following provides an example of an application providing application analytics based on combined gaze and selection data. In this example, the application, via a selection tracker 182, monitors for clicks/finger touch/drag and other UI item selections on the UI. Based on the UI item and/or the associated action, the application searches to identify any group G having the action/UI item. The application next considers all gaze pauses (determined by a gaze tracker 184) between a particular selection and the previous selection or within a threshold time before the selection. The application's gaze tracker 184 determines whether there were any corresponding gazes on other UI items in group G by (a) determining the UI item/action for each gaze using a location map L; (b) collecting the time spent gazing; and (c) searching for each of those items/actions in the group G. For each UI item/action, the application's analytics producer 186 is configured to output the selected UI item/action and a group with an array of type {action, gaze=true/false, time spent=foo msecs} corresponding to other UI items/actions considered. In this way, the analytics configured application collects data for all possible UI items/actions considered and gazed upon, before selection of a particular action in the same group. This also provides data on UI items/actions from the groups that were not gazed upon (gaze=false).

This information facilitates the identification of non-discoverable items such as those that are consistently missed (gaze=false) in any particular group. It also facilitates the identification of unpopular items by identifying UI items that are consistently gazed upon but not selected. Once data is collected, the metrics can be displayed via graphs or any other means. Unlike traditional analytics data gathering, the analytics data is based on gathering data on which UI items are considered before another UI item is selected. The data gathered helps (a) identify non-discoverable items and (b) identify non-popular items or very popular items with more confidence, by accounting for discoverability. This helps analysts/application developers determine the relative importance/performance/popularity of UI item, and ultimately enables them to provide a more satisfying, better performing UI to the users.

Embodiments of the invention enable flexible choice-based application analytics that account for gaze and selection data. An analyst is enabled, in certain embodiments, to specify groups of UI items to compare UI items that are appropriate for analysts purposes. Moreover, a UI item can be included in multiple groups. For example, if a first group includes UI items A, B, C and a second group includes UI items A, D, and E, a selection of A can trigger two sets of analytics data. If the user looked at B and D but did not look at C and E before the selection of A, two message are sent. The messages include one message for the first group identifying that A was selected, that B was gazed on, and that C was not gazed upon. The messages also include another message for the second group identifying that A was selected, that D was gazed upon, and that E was not gazed upon. Each set of analytics data provides valuable information to the analyst.

Embodiments of the invention also enable identifications of UI items that are not sufficiently discoverable, i.e., of UI items that users commonly overlook or miss. Such identification can be based on a low percentage of gazes upon such items prior to selections of similar UI items (or other UI items in the same group). For example, if the analytics data shows that gaze is false for more than a threshold percentage of the time then a UI item can be labeled as non-discoverable. In other embodiments of the invention, discoverability is quantified. For example, a UI item's discoverability can be scored on a discoverability index from zero to one based on the percentage of instances in which gaze is true versus false prior to selections of other items in the UI items group.

A discoverability index or other quantification of a UI item's discoverability is used to adjust selection data to account for discoverability in embodiments of the invention. For example, an analyst may identify a group of three UI items (A, B, C) and to determine which of the three UI items is the most popular based on selections of those items. Raw selection data results show that A received 100 clicks, B received 200 clicks, and C received 400 clicks. The raw data suggests that C is twice as popular as B which is twice as popular as A. However, discoverability data may alter this evaluation. For example, the discoverability index values may reveal that A has a discoverability score of 0.2, B has a discoverability score of 0.9, and C has a discoverability score of 1.0. This suggests that at least some of the poor click performance of A is due to its lack of discoverability. The analytics data presented to the analyst can present the raw click data, the discoverability scores, and/or adjusted click data that accounts for the discoverability scores to present a more complete picture of the popularity of the UI items.

In another example, analytics data is collected and compiled to provide clicks, discoverability values, intermediate clicks, and/or adjusted clicks. Intermediate clicks equal clicks divided by discoverability value and adjusted clicks equal intermediate clicks divided by the total intermediate clicks times the total clicks. For example, the following information could be provided for three UI items (A, B, C) in a group. Based on UI item A receiving 100 clicks and having a discoverability value of 0.5, an intermediate click value of 200 (100/0.5) and an adjusted click values of 156.52 (200*600/766.67=200*0.7826) are determined. Based on UI item B receiving 200 clicks and having a discoverability value of 0.75, an intermediate click value of 266.67 (200/0.75) and an adjusted click values of 208.69 (266.67*0.7826) are determined. Based on UI item C receiving 300 clicks and having a discoverability value of 1.0, an intermediate click value of 300 (300/1) and an adjusted click values of 234.78 (300*0.7826) are determined. The adjusted click values provide a more accurate picture of the popularity of the UI items since they are adjusted to account for discoverability.

Exemplary Computing Environment

Figure 7:
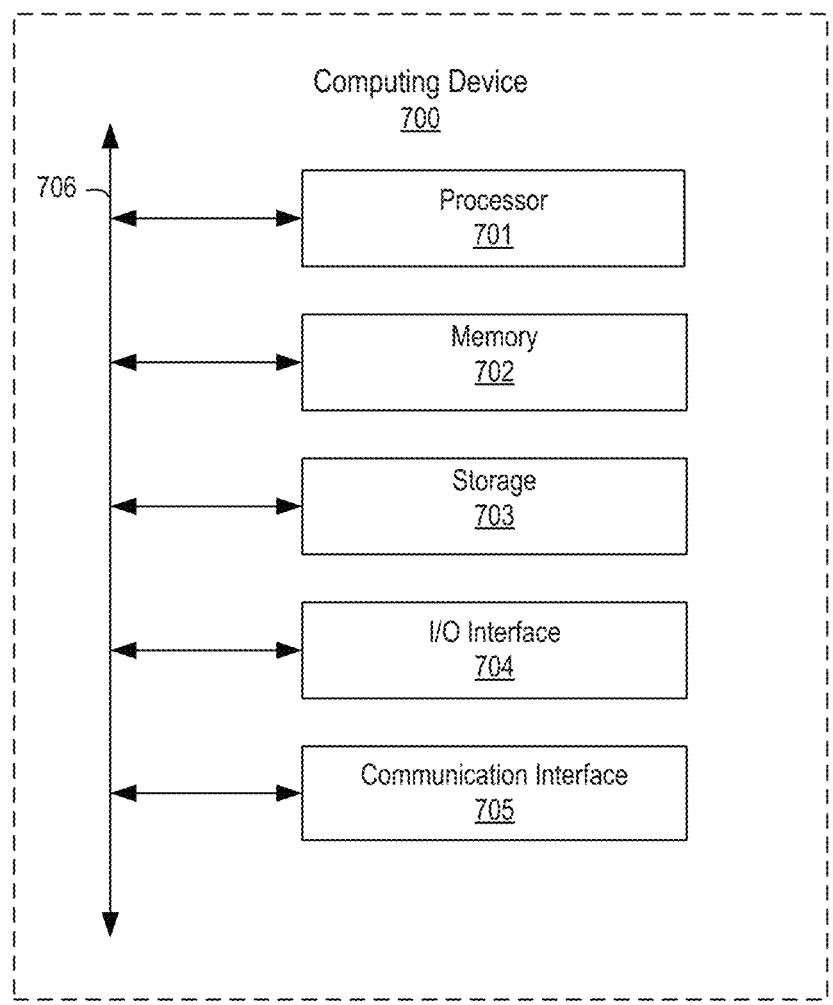
FIG. 7 is a block diagram depicting an example hardware implementation.

Any suitable computing system or group of computing systems can be used to implement the techniques and methods disclosed herein. For example, FIG. 7 is a block diagram depicting examples of implementations of such components. The computing device 700 can include a processor 701 that is communicatively coupled to a memory 702 and that executes computer-executable program code and/or accesses information stored in memory 702 or storage 703. The processor 701 may comprise a microprocessor, an application-specific integrated circuit ("ASIC"), a state machine, or other processing device. The processor 701 can include one processing device or more than one processing device. Such a processor can include or may be in communication with a computer-readable medium storing instructions that, when executed by the processor 701, cause the processor to perform the operations described herein.

The memory 702 and storage 703 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing device 700 may also comprise a number of external or internal devices such as input or output devices. For example, the computing device is shown with an input/output ("I/O") interface 704 that can receive input from input devices or provide output to output devices. A communication interface 705 may also be included in the computing device 700 and can include any device or group of devices suitable for establishing a wired or wireless data connection to one or more data networks. Non-limiting examples of the communication interface 705 include an Ethernet network adapter, a modem, and/or the like. The computing device 700 can transmit messages as electronic or optical signals via the communication interface 705. A bus 706 can also be included to communicatively couple one or more components of the computing device 700.

The computing device 700 can execute program code that configures the processor 701 to perform one or more of the operations described above. The program code can include one or more modules. The program code may be resident in the memory 702, storage 703, or any suitable computer-readable medium and may be executed by the processor 701 or any other suitable processor. In some Techniques, modules can be resident in the memory 702. In additional or alternative Techniques, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more Techniques of the present subject matter. Any suitable programming, scripting, or other type of language or combinations of languages may be used to implement the teachings contained herein in software to be used in programming or configuring a computing device.

Techniques of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific Techniques thereof, it will be appreciated that those skilled in the art, upon attaining an understanding of the foregoing, may readily produce alterations to, variations of, and equivalents to such Techniques. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of determining discoverability of user interface (UI) items, the method comprising:
   identifying a gaze of a user corresponding to a first UI item from a group of UI items;
   identifying a direct user interaction of the user with a second UI item from the group of UI items, wherein each UI Item in the group of UI items corresponds to an action within an application, and wherein the direct user interaction with the second UI item comprises a mouse click or touch screen tap on the second UI item;
   determining that the second UI item comprises a selected UI item triggering the corresponding action based on the direct user interaction;
   identifying other UI items from the group of UI items other than the selected UI item;
   determining that the first UI item is among the other UI items and that the gaze is between the direct user interaction with the second UI item and a previous selection or within a predetermined quantity of time prior to the direct user interaction with the second UI item;
   determining that a third UI item is among the other UI items and was not gazed upon between the direct user interaction with the second UI item and the previous selection or within the predetermined quantity of time prior to the direct user interaction with the second UI item; and
   determining a discoverability value for the first UI item and a discoverability value for the third UI item based on the first UI item and the third UI item being among the other UI items, and based on the gaze corresponding to the first UI item, wherein the discoverability value for the first UI item and the discoverability value for the third UI item represent a likelihood that the user will observe the first UI item and the third UI item, respectively, based on a layout of the group of UI items.

2. The method of claim 1, further comprising:
   accessing a location map, wherein the location map identifies bounding boxes corresponding to the group of UI items and actions corresponding to the group of UI items.

3. The method of claim 2, wherein the bounding boxes are based on margins added around perimeters of the group of UI items.

4. The method of claim 1, further comprising:
   identifying the group of UI items based on determining that the second UI item is in the group of UI items;
   determining the other UI items in the group of UI items based on a set of similar grouped actions associated with the second UI item and the other UI items; and identifying analytics data that identifies a set of the UI items in the group of UI items that were not gazed upon.

5. The method of claim 1, further comprising:
identifying, for each respective UI item in the other UI items, the corresponding action and whether the respective UI item was gazed upon.

6. The method of claim 1, further comprising:
identifying, for each respective UI item in the other UI items, the corresponding action and time spent gazing on the respective UI item.

7. The method of claim 1 further comprising:
compiling analytics data identifying occurrences when the first UI item was gazed upon prior to selections of other UI items in the group of UI items; and
determining the discoverability value of the first UI item based on the analytics data with respect to a first selectable action for the first UI item and the third UI item.

8. The method of claim 7, further comprising adjusting a measure of performance of the first UI item based on the discoverability value for the first UI item.

9. The method of claim 1, further comprising:
determining that the first discoverability value is below a threshold value; and
automatically adjusting the first UI item to balance discoverability of among the group of UI items.

10. A system for providing analytics data that combines gaze data and selection data, the system comprising:
at least one processor; and
a non-transitory computer-readable storage medium comprising instructions that, when executed by the at least one processor, cause the at least one processor to:
provide an application having a user interface (UI) with UI items that are selectable by user interactions received via an input device to perform corresponding selectable actions, wherein the UI items comprise a group of UI items grouped for identifying a relative discoverability of UI items of the group of UI items, including a first UI item being configured, when selected, to perform a first selectable action in the application, a second UI item being configured, when selected, to perform a second selectable action in the application, and a third UI item being configured, when selected, to perform a third selectable action in the application;
track gaze locations on the UI based on monitoring eye movements and eye pauses, including determining prior gaze activity indicating that a gaze of a user is detected with respect to the first UI item;
track a selection of the second UI item comprising a direct user interaction of the user with the second UI item to perform the second selectable action, wherein the direct user interaction with the second UI item comprises a mouse click or touch screen tap on the second UI item;
identifying other items from the group of UI items other than the second UI item based on the selection;
determining that the first UI item is among the other UI items and that the prior gaze activity is between the selection of the second UI item and a previous selection or within a predetermined quantity of time prior to the selection of the second UI item;
determining that the third UI item is among the other UI items and was not gazed upon between the selection of the second UI item and the previous selection or within the predetermined quantity of time prior to the selection of the second UI item; and
provide analytics data comprising discoverability values representing a likelihood that the user will observe the first UI item and the third UI item, wherein the discoverability values are based on a layout of the group of UI items.

11. The system of claim 10, further comprising:
determining that a gaze corresponds to the first UI item based on determining that a gaze location is within a bounding box corresponding to the first UI item based on a location map, wherein the location map identifies bounding boxes corresponding to the UI items and actions corresponding to the UI items.

12. The system of claim 10, further comprising:
identifying the group of UI items based on determining that a selected UI item is in the group, wherein the analytics data identifies a set of the UI items in the group that were gazed upon prior to selection of the selected UI item.

13. The system of claim 10, further comprising:
identifying the group of UI items based on determining that a selected UI item is in the group, wherein the analytics data identifies a set of the UI items in the group that were not gazed upon prior to selection of the selected UI item.

14. The system of claim 10, wherein the analytics data comprises an array identifying, for each respective UI item of the other UI items, an associated action, data indicating whether the respective UI item was gazed upon, and a time spent gazing on the respective UI item.

15. A non-transitory computer readable medium comprising instructions for causing a computing device to perform operations comprising:
providing a user interface (UI) for display, wherein providing the UI comprises providing UI items that are selectable by user interactions received via an input device to perform corresponding selectable actions, wherein the UI items comprise a group of UI items grouped for identifying a relative discoverability of UI items of the group of UI items, the group of UI items including a first UI item being configured, when selected, to perform a first selectable action in an application, a second UI item being configured, when selected, to perform a second selectable action in the application, and a third UI item being configured, when selected, to perform a third selectable action in the application;
determining gaze locations that identify coordinates of gazes, wherein the gaze locations are determined based on monitoring eye movements and eye pauses, including determining prior gaze activity indicating that a gaze of a user is detected with respect to the first UI item;
receiving a selection of second UI item comprising a direct user interaction of the user with the second UI item to perform the second selectable action based on input received via the input device, wherein the direct user interaction with the second UI item comprises a mouse click or touch screen tap on the second UI item;
identifying other UI items from the group of UI items other than the second UI item based on the selection;
determining that the first UI item is among the other UI items and was gazed upon between the selection of the second UI item and a previous selection or within a predetermined threshold time before the selection of the second UI item;

determining that the third UI item is among the other UI items and was not gazed upon between the selection of the second UI item and the previous selection or within the predetermined threshold time before the selection of the second UI item; and providing analytics data comprising discoverability values representing a likelihood that the user will observe the first UI item and the third UI item, wherein the discoverability values are based on a layout of the group of UI items, and wherein the analytics data is based on the prior gaze activity and the selection of the second UI item between the selection of the second UI item and the previous selection or within the predetermined quantity of time prior to the selection of the second UI item.

16. The non-transitory computer readable medium of claim 15, wherein the providing the analytics data comprises identifying the group of UI items based on determining that a selected UI item is in the group, wherein the analytics data identifies a set of the UI items in the group that were gazed upon prior to selection of the selected UI item.

17. The non-transitory computer readable medium of claim 15, wherein the providing the analytics data comprises identifying the group of UI items based on determining that a selected UI item is in the group, wherein the analytics data identifies a set of the UI items in the group that were not gazed upon prior to selection of the selected UI item.

* * * * *